United States Patent
Gu et al.

(10) Patent No.: US 8,367,258 B2
(45) Date of Patent: Feb. 5, 2013

(54) ELECTRIC POWER SOURCE ARRANGEMENT AND METHOD OF HOW TO USE IT

(75) Inventors: Zhijun Gu, Shanghai (CN); Ke Jin, Shanghai (CN); Yong Lu, Kunshan (CN)

(73) Assignee: Horizon Fuel Cell Technologies, Singapore (SG)

( * ) Notice: Subject to any disclaimer, the term of this patent is extended or adjusted under 35 U.S.C. 154(b) by 369 days.

(21) Appl. No.: 12/754,001

(22) Filed: Apr. 5, 2010

(65) Prior Publication Data

US 2010/0261085 A1   Oct. 14, 2010

(30) Foreign Application Priority Data

Apr. 9, 2009  (CN) .......................... 2009 1 0048996

(51) Int. Cl.
  *H01M 8/04* (2006.01)
(52) U.S. Cl. .................... 429/428; 429/430; 429/432
(58) Field of Classification Search .................. 429/428, 429/430, 432, 431
  See application file for complete search history.

(56) References Cited

U.S. PATENT DOCUMENTS 6,255,008 B1 *  7/2001 Iwase ................................ 429/9

* cited by examiner

*Primary Examiner* — Raymond Alejandro
(74) *Attorney, Agent, or Firm* — Woods Rogers PLC; Peter E. Rosden

(57) ABSTRACT

An electric power source arrangement is described, comprising a fuel cell means (2) having a nominal voltage and a specified voltage-current characteristic, to be connected to a load (1), and comprising a variable DC-DC voltage converter (3), a by-pass branch (11) by-passing the DC-DC voltage converter, a switch (13) alternatively connecting the fuel cell to the DC-DC voltage converter or to the by-pass branch, and a control unit (12) controlling the switch, which control unit (12) comprises a measuring device coupled to the fuel cell means (2) for detecting the operating point thereof and is configured to connect the by-pass branch (11) if the fuel cell means voltage is within a selected range of section (5) of the voltage-current characteristic of the fuel cell means and to disconnect the by-pass branch in the remaining range of sections (4, 6, 7) of said characteristic.

16 Claims, 2 Drawing Sheets

ELECTRIC POWER SOURCE ARRANGEMENT AND METHOD OF HOW TO USE IT

CROSS-REFERENCES TO RELATED APPLICATIONS

This application claims foreign priority from application number 200910048996.2 filed in China on Apr. 9, 2009.

FIELD OF THE INVENTION

The present invention relates to an electric power source arrangement comprising a fuel cell means having a nominal voltage and a specified voltage-current characteristic, to be connected to a load, and comprising a variable DC-DC voltage converter, a by-pass branch by-passing the DC-DC voltage converter, a switch alternatively connecting the fuel cell to the DC-DC voltage converter or to the by-pass branch, and a method of how to use the arrangement.

BACKGROUND OF THE INVENTION

An electric power source arrangement as stated above, i.e. a fuel cell system capable of reducing an electric power loss, is known from U.S. Pat. No. 6,255,008 B1. In this system, a secondary battery is connected in parallel to the power source arrangement. Depending on the power demand of a load and the status of charge of the battery, the battery is connected or disconnected to the load, the fuel cell is connected to the load via the DC-DC voltage converter or via the by-pass branch or the fuel cell is connected to both the battery and load via the DC-DC voltage converter.

The characteristic of a fuel cell is that the ideal fuel cell has a comparably high output voltage which decreases when current is drawn. Then for a considerable interval of amperage the output voltage keeps almost constant, decreasing by some percent only, and then, after a certain value of current is passed, the voltage drops significantly. The DC-DC voltage converter serves to see to more or less constant voltage, at least in the steeper parts of the characteristics. It has an efficiency of e.g. 70% to 90%. The by-pass branch serves to avoid the loss caused by the converter as long as the voltage is sufficiently close to the nominal voltage.

SUMMARY OF THE INVENTION

It is an object of the invention to provide a useful control for the switch-changing between the DC-DC voltage converter and the by-pass branch.

According to the invention, the electric power source arrangement is characterized in that the control unit comprises a measuring device coupled to the fuel cell means for detecting the operating point thereof and is configured to connect the by-pass branch if the fuel cell means voltage is within a selected range of the voltage-current characteristic of the fuel cell means and to disconnect the by-pass branch in the remaining range of said characteristic.

Preferably, the selected range of the voltage-current characteristic is the range at both sides of the nominal voltage wherein the voltage difference in dependency of current changes is not more than 25%, more preferably not more than 15% and even more preferably not more than 5% depending on the demand of the load.

According to advantageous embodiments the control unit, the switch, the by-pass branch and the DC-DC voltage converter are integral parts of a single unit; the switch is an electronic switch, preferably a MOSFET or an IGBT; and the DC-DC voltage converter is a stabilized closed-loop controlled converter.

According to the invention, a method of how to use the electric power source arrangement is provided, wherein the switch is in the status of connecting the by-pass branch if the fuel cell means voltage is within a selected range of the voltage-current characteristic of the fuel cell means and is in the status of disconnecting the by-pass branch in the remaining range of said characteristic, the selected range being determined to be the range at both sides of the nominal voltage wherein the voltage difference in dependency of current changes is not more than 25%, more preferably not more than 15% and even more preferable not more than 5%.

According to the invention, a method of how to control the electric power source arrangement, wherein the range of the characteristic limiting the selected range towards lower voltages is divided into at least two sections, i.e. a recovering section and a shutdown section, the recovering section being limited by a first operational point representing the minimum fuel cell means output voltage to be still convertible under continuous operation conditions and a second operational point beyond which the shutdown section starts, is provided in that in the recovering section the DC-DC voltage converter issues a sub-nominal voltage, further that in the recovering section the fuel cell means is intermittently switched off and re-started, preferably according to time and/or idle voltage of the fuel cell. If using a DC-DC voltage converter capable of stepping up the voltage, between the selected range and the recovering section, an adapting section is provided wherein the converter issues the nominal voltage.

BRIEF DESCRIPTION OF THE DRAWINGS

The foregoing and further objects, features and advantages of the present invention will become apparent from the following description of preferred embodiments with reference to the accompanying drawings.

DETAILED DESCRIPTION OF PREFERRED EMBODIMENTS

Figure 1:
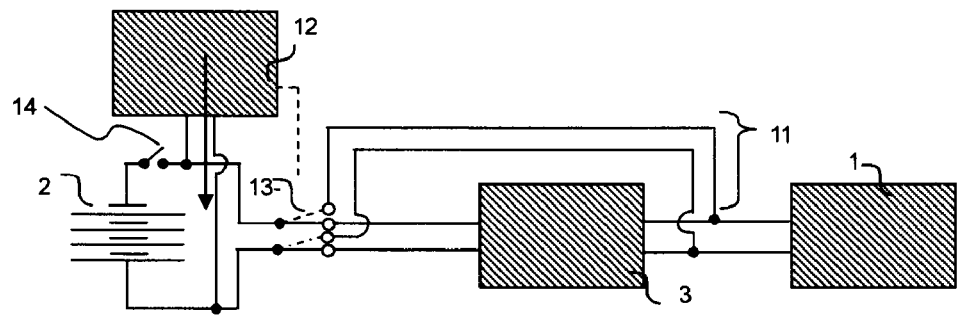
FIG. 1 shows the circuit diagram of an electric power source arrangement connected to a load.

The diagram of FIG. 1 shows the electric circuit of a power source arrangement connected to a load 1. The power source arrangement comprises a fuel cell 2, which, in the present example, has a nominal voltage of 700 mV per single cell, an idle voltage of 950 mV, a point of minimum continuous voltage of 600 mV and a point of absolutely minimum voltage of 500 mV, and a DC-DC voltage converter 3. The voltage converter can be a step-down converter, a step-up converter or a combined one, and can be a converter issuing voltages different from the nominal voltage depending on excessive input voltages. The fuel cell 2 in practise will usually be an arrangement of 10 to 100 single cells connected in series.

Figure 2:
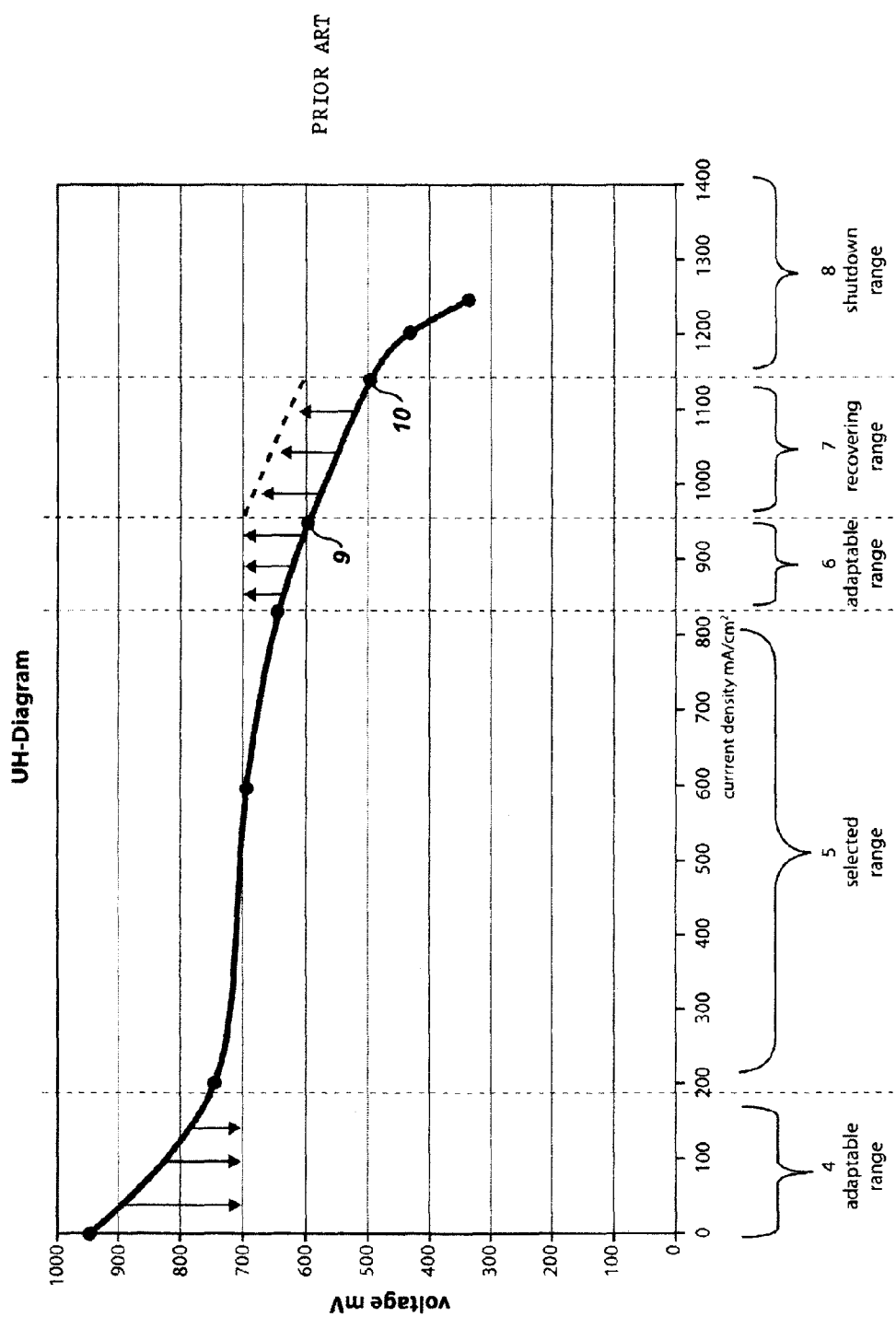
FIG. 2 shows a typical voltage-current characteristic of a fuel cell means.

FIG. 2 shows the voltage-current characteristic of the fuel cell 2 showing the voltage in mV per single cell versus the current density in mA/cm². This characteristic has a first steep section 4 from the idle voltage of the fuel cell until the nominal voltage plus a certain percentage, a second, considerably less steep section 5 containing the nominal voltage, a third again steeper section 6 beyond the second section 5 to the point of minimum continuous voltage, a fourth recovery section 7 between the point of minimum continuous voltage and a point of absolutely minimum voltage and a very steep, last shutdown section 8 beyond the point of absolutely minimum voltage.

The section 5 extends at both sides of the nominal voltage by a voltage difference of some percent, which needs not be equal at both sides, and constitutes the above mentioned selected range. The selected range is determined so that it covers the allowed voltage fluctuation of the load 1. Sections 4, 6 and 7 constitute the above mentioned remaining range wherein only sections 4 and 6 constitute an adaptable range with continuous operational conditions. The operational point 9 of minimum continuous voltage that narrows section 6 on the lower voltage side is defined by the lowest voltage point wherein the fuel cell could barely run without causing problems e.g. in terms of cooling or efficiency. The operational point 10 of absolutely minimum voltage that borders section 7 on the lower voltage side against section 8 represents an operational point beyond which the efficiency and performance of the fuel cell 2 is too poor and a continuous operation is no more possible due to too much problems with the fuel cell e.g. with the cooling system.

As the load 1 draws different current intensities, the voltage issued by the fuel cell 2 changes along the characteristic. In sections 4 and 6, the voltage is too far away from the nominal voltage and thus, the DC-DC voltage converter 3 adapts the voltage to the nominal voltage as shown by arrows in FIG. 2. A continuous operation in the adaptable range 4, 6 with the DC-DC voltage converter 3 is possible. In order to avoid the loss dissipated in converter 3 as long as the operation point is section 5 the converter 3 is by-passed by a by-pass branch 11. A control unit 12 measures the output voltage and/or the output current of the fuel cell 2 and, as long as the operating point is within the range of section 5, the control unit 12 directs the current to by-pass the converter 3 and flow via the by-pass branch 11. For this purpose, the control unit 12 controls a switch 13 switching over between converter 3 and by-pass branch 11. A switch 14 switches the output of the fuel cell 2. In the example shown, the nominal voltage being 700 mV, the range of section 5 is from 750 mV to 650 mV, corresponding to current densities of 200 mA/cm$^2$ and 830 mA/cm.

Figure 3:
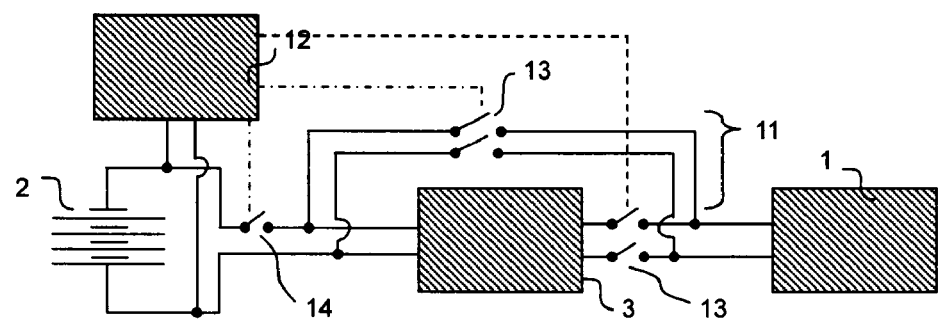
FIG. 3 shows a modified embodiment of the invention.

FIG. 3 still shows a different switch arrangement, i.e. one switch in the by-pass branch 11 and one switch in the output of the converter 3, with respective control by the control unit 12. The switch 14, also controlled by control unit 12, in this embodiment is positioned behind the taps connecting the control unit 12 and before the taps connecting the switch 13.

In section 7 the voltage measured from the control unit 12 is too far away from the nominal voltage. A continuous power output of the fuel cell 2 is no longer suitable because the low voltage starts causing severe problems e.g. in terms of cooling or efficiency. Thus, the operational point in the recovery section 7 tends to leave this section to section 6 or 5 if recovery is successful or to section 8 if recovery is not possible. As long as the operational point is in this section 7, the adapted DC-DC voltage converter 3 will not issue the nominal voltage but a voltage less than the nominal voltage, as shown by arrows in FIG. 2. Recovery takes place as follows wherein, depending on the chosen load 1, two different scenarios are possible:

If the load 1 is adaptable to a lower voltage e.g. an Ohm resistive load, the current will decrease with the decreased voltage. E.g. if the load is an incandescent lamp, it will work with lower light intensity but in a not suitable operational range. The desired consequence is that the fuel cell 2 can recover due to the lower current e.g. by reactivation of the catalyst, and reach section 6 again wherein a continuous operation is possible. The DC-DC voltage converter 3 can issue the nominal voltage again as described above.

If the chosen load 1 is an active one i.e. a load that demands a constant power, the fuel cell 2 can not recover in section 7 and can not attain section 6. Due to the fact that a continuous operation in section 7 is no longer possible, a signal to the load or respectively the operator behind the load that an adjustment is necessary, will be issued. According to a specific method, a final attempt of recovery cycle will now start. The fuel cell 2 will shutdown by the switch 14 for a certain time interval only. According to a first embodiment, this time interval is a predefined, short time interval of preferably 1 to 20 seconds, most preferably 5 seconds, then the fuel cell will be reconnected. According to a second embodiment, this interval is limited by the idle voltage measured by the control unit 12 which controls the switch 14 in the arrangement of FIG. 3. After the reconnection the control unit 12 measures the output voltage and/or the output current of the fuel cell 2 again and defines whether section 6 is reached. If so, the DC-DC voltage converter will be adapted in the already described manner. If not, the final recovery cycle will start again. This shutdown and restart cycle will be applied to the fuel cell 2 for a maximum number of cycles, preferably between 5 and 30 cycles, most preferable for 20 cycles. If section 6 could not be reached the fuel cell 2 will shutdown completely.

In section 8 beyond the operational point 10 of absolutely minimum voltage a continuous operation is not possible, problems with the fuel cell 2 are too severe even to start a final recovery cycle like in section 7. A shutdown of the fuel cell will be applied immediately.

The items 3, 11, 12 and 13 are shown as distinct elements, in practise it will be useful to integrate them into a single unit.

In the circuit arrangement of FIG. 1, the DC-DC voltage converter 3 is a step-up and step-down converter which is active in sections 4, 6 and 7. If the converter 3 is a step-down converter only, the current is directed via the by-pass branch 11 also in sections 6 and 7 considering the above control measures. In this case section 4 only constitutes the above mentioned remaining range. The converter 3 is preferred a closed-loop controlled converter.

The switch 13 is shown as a double pole switch, obviously a single pole switch will do. The switch 13 can be an electronic switch capable of switching the occurring current intensities, preferred elements are a MOSFET or an IGBT.

REFERENCE LIST 1 load
2 fuel cell
3 DC-DC voltage converter
4 adapted section
5 selected section
6 adapted section
7 recovery section
8 shutdown section
9 operational point
10 operational point
11 by-pass branch
12 control unit
13 switches
14 switch

The invention claimed is:
1. A high efficiency electric power source arrangement for a fuel cell having a fluctuating voltage operating point and a voltage-current characteristic divided into four operational ranges comprising a first adaptable range, a second selected range associated with a nominal voltage, a third adaptable range and a fourth recovering range, each range corresponding to a predetermined range of voltages and currents, the fuel cell being connected to a load having a predetermined allowed voltage fluctuation corresponding to a selected range, the power source arrangement comprising:

a DC-DC voltage converter having an input and an output;
a by-pass branch connected between the input and the output of said DC-DC voltage converter;
a first switch connecting the output of the fuel cell either to the input of said DC-DC voltage converter or to said by-pass branch;
a second switch alternatively connecting and disconnecting the fuel cell to said first switch; and
a control unit controlling said first switch and said second switch, characterized in that said control unit further comprises measuring device means coupled to the fuel cell for detecting the voltage operating point thereof, for connecting the fuel cell to said by-pass branch if the voltage operating point is within the range of voltages corresponding to the second selected range of the voltage-current characteristic, and for disconnecting the fuel cell from said by-pass branch if the voltage operating point is within the range of voltages corresponding to any of the first adaptable range, the third adaptable range or the fourth recovering range of the voltage-current characteristic.

2. An electric power source arrangement according to claim 1, characterized in that the second selected range of the voltage-current characteristic is the range at both sides of the nominal voltage wherein the voltage change resulting from a current change is not more than 25% of the nominal voltage.

3. An electric power source arrangement according to claim 1, characterized in that the voltage change resulting from a current change is not more than 15%.

4. An electric power source arrangement according to claim 1, characterized in that the voltage change resulting from a current change is not more than 5%.

5. An electric power source arrangement according to claim 1, characterized in that said control unit, said switches, said by-pass branch and said DC-DC voltage converter are integral parts of a single unit.

6. An electric power source arrangement according to claim 5, characterized in that each said switch is an electronic switch.

7. An electric power source arrangement according to claim 6, characterized in that each said switch is one selected from the group consisting of a MOSFET or an IGBT.

8. An electric power source arrangement according to claim 5, characterized in that said DC-DC voltage converter is a stabilized closed-loop controlled converter.

9. A high efficiency electric power source arrangement for a fuel cell incorporating a catalyst, the fuel cell having a fluctuating voltage operating point and a voltage-current characteristic divided into four operational ranges those being a first adaptable range, a second selected range associated with a nominal voltage, a third adaptable range and a fourth recovering range, each range corresponding to a predetermined range of voltages and currents, connected to a load having a predetermined allowed voltage fluctuation corresponding to a selected range, the power source arrangement comprising:

a DC-DC voltage converter having an input and an output,
a by-pass branch connected between the input and the output of said DC-DC voltage converter;
a first switch located in said by-pass branch for connecting and disconnecting said by-pass branch;
a second switch located between the output of the fuel cell and before said by-pass branch alternatively connecting and disconnecting the output of the fuel cell to said first switch or said DC-DC converter; and
a third switch connecting the output of said DC-DC voltage converter to the load; and
a control unit controlling said first switch, said second switch and said third switch characterized in that said control unit further comprises measuring device means coupled to the fuel cell for detecting the voltage operating point thereof, for connecting the fuel cell to said by-pass branch if the voltage operating point is within the range of voltages corresponding to the second selected range of the voltage-current characteristic, for connecting the fuel cell to said DC-DC voltage converter when the voltage operating point voltage is within the known range of voltages for the first adaptable range and the third adaptable range of voltage, for causing the catalyst within the fuel cell to be reactivated when the load is adaptable and the voltage operating point is within the fourth recovering range of voltages, for causing said second switch to repeatedly open and then close again after a predetermined period of time for a maximum number of cycles when the load requires constant power and the voltage operating point is within the fourth recovering range of voltages and for shutting down the fuel cell when the voltage at the operating point is below the lowest voltage in the known fourth recovering range of voltages.

10. An electric power source arrangement according to claim 9, characterized in that the second selected range of the voltage-current characteristic is the range at both sides of the nominal voltage wherein the voltage change resulting from a current change is not more than 25% of the nominal voltage.

11. An electric power source arrangement according to claim 9, characterized in that the voltage change resulting from a current change is not more than 15%.

12. An electric power source arrangement according to claim 9, characterized in that the voltage change resulting from a current change is not more than 5%.

13. An electric power source arrangement according to claim 9, characterized in that said control unit, said first switch, said second switch, said third switch, said by-pass branch and said DC-DC voltage converter are integral parts of a single unit.

14. An electric power source arrangement according to claim 13, characterized in that said first switch, said second switch and said third switch are each electronic switches.

15. An electric power source arrangement according to claim 14, characterized in that each said switch is one selected from the group consisting of a MOSFET or an IGBT.

16. An electric power source arrangement according to claim 13, characterized in that said DC-DC voltage converter is a stabilized closed-loop controlled converter.

* * * * *